United States Patent
He et al.

(10) Patent No.: US 12,363,725 B2
(45) Date of Patent: Jul. 15, 2025

(54) METHOD FOR PDCCH DETECTION, METHOD FOR PDCCH TRANSMISSION, AND DEVICES

(71) Applicant: GUANGDONG OPPO MOBILE TELECOMMUNICATIONS CORP., LTD., Guangdong (CN)

(72) Inventors: Chuanfeng He, Guangdong (CN); Wenqiang Tian, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 530 days.

(21) Appl. No.: 17/686,099

(22) Filed: Mar. 3, 2022

(65) Prior Publication Data
US 2022/0240231 A1 Jul. 28, 2022

Related U.S. Application Data

(63) Continuation of application No. PCT/CN2019/108306, filed on Sep. 26, 2019.

(51) Int. Cl.
H04W 72/04 (2023.01)
H04W 72/23 (2023.01)
H04W 74/08 (2024.01)
H04W 74/0808 (2024.01)

(52) U.S. Cl.
CPC ....... *H04W 72/23* (2023.01); *H04W 74/0808* (2013.01)

(58) Field of Classification Search
CPC .................... H04W 72/042; H04W 74/0808
See application file for complete search history.

(56) References Cited

U.S. PATENT DOCUMENTS

2021/0329577 A1* 10/2021 Jiang ................. H04J 11/0076
2022/0240231 A1* 7/2022 He ..................... H04L 5/0023

FOREIGN PATENT DOCUMENTS

| CN | 109076378 A | 12/2018 |
| CN | 110224802 A | 9/2019 |
| WO | 2018172987 A1 | 9/2018 |

OTHER PUBLICATIONS

Japanese Decision of refusal with English Tranlsation for JP application No. 2022514277 dated Oct. 24, 2023. 7 pages.
LG Electronics, Initial access and mobility for NR-U, 3GPP TSG RAN WG1 #98, R1-1908536, Aug. 26-30, 2019. (15 pages).
Spreadtrum Communications, Discussion on initial access and mobility in NR-U, 3GPP TSG RAN WG1 Meeting #98, R1-1908964, Aug. 26-30, 2019. (10 pages).

(Continued)

*Primary Examiner* — Muthuswamy G Manoharan
(74) *Attorney, Agent, or Firm* — Young Basile Hanlon & MacFarlane, P.C.

(57) ABSTRACT

A method for physical downlink control channel (PDCCH) detection, a method for PDCCH transmission, and devices are provided. The method includes the following. At least one candidate position of a first synchronization signal block (SSB) is determined, where SSBs at the at least one candidate position are quasi co-located (QCL). A PDCCH monitoring occasion corresponding to the at least one candidate position is determined. A PDCCH on the PDCCH monitoring occasion is detected.

7 Claims, 8 Drawing Sheets

(56) References Cited

OTHER PUBLICATIONS

NTT Docomo, Inc., Initial access signals and channels for NR-U, 3GPP TSG RAN WG1 #98, R1-1909174, Aug. 26-30, 2019. (13 pages).

Extended European Search Report for EP Application 19947270.5 mailed Jul. 1, 2022. (13 pages).

3GPP TS 38.213 V15.6.0 (Jun. 2019); Technical Specification Group Radio Access Network; NR; Physical layer procedures for control (Release 15). (107 pages).

Japanese Notice of Reasons for Refusal with English Translation for JP Application 2022514277 mailed Jul. 18, 2023. (8 pages).

Communication pursuant to Article 94(3) EPC for EP Application 19947270.5 mailed Aug. 22, 2023. (10 pages).

Chinese second review opinion with English Translation for CN Application 202210356623.7, mailed Aug. 10, 2023 (23 pages).

International Search Report with English Translation for International Application PCT/CN2019/108306 mailed Jun. 28, 2020. (15 pages).

Spreadtrum Communications, Discussion on initial access and mobility in NR-U, 3GPP TSG RAN WG1 Meeting #97, R1-1906375, May 13-17, 2019. (13 pages).

3rd Generation Partnership Project; Technical Specification Group Radio Access Network; NR; User Equipment (UE) procedures in Idle mode and RRC Inactive state (Release 15), 3GPP TS 38.304 V15.3.0, Mar. 2019. (28 pages).

3GPP TSG RAN WG1 Meeting #97, Reno USA, R1-1907883, Qualcomm Incorporated, Feature lead summary on initial access signals and channels for NR-U, May 13-May 17, 2019. (44 pages).

3GPP TSG RAN WG1 Meeting #98, Prague, Czech Rep R1-1908963, Spreadtrum Communications, Discussion on DRS in NR-U, Aug. 26-30, 2019. (13 pages).

Communication pursuant to Article 94(3) EPC for EP Application 19947270.5 mailed Mar. 17, 2023. (11 pages).

Chinese Office Action with English Translation for CN Application 202210356623.7 mailed Jun. 2, 2023. (22 pages).

\* cited by examiner

METHOD FOR PDCCH DETECTION, METHOD FOR PDCCH TRANSMISSION, AND DEVICES

CROSS-REFERENCE TO RELATED APPLICATION(S)

This application is a continuation of International Application No. PCT/CN2019/108306, filed on Sep. 26, 2019, the entire disclosure of which is incorporated herein by reference.

TECHNICAL FIELD

Implementations of the present disclosure relate to the field of communication, and more particularly to a method for physical downlink control channel (PDCCH) detection, a method for PDCCH transmission, and devices.

BACKGROUND

In the new radio (NR) technology, if a synchronization signal block (SSB) and a type0-physical downlink control channel (Type0-PDCCH) control resource set (CORESET) are multiplexed in pattern 1, a Type0-PDCCH monitoring occasion can be uniquely determined according to an SSB index and a monitoring occasion related parameter.

In other words, Type0-PDCCH monitoring occasions are in one-to-one correspondence with SSBs.

In the new radio in unlicensed spectrum (NR-U) technology, a network device can transmit SBBs at multiple candidate positions within a discovery reference signal (DRS) transmission window according to a result of listen before talk (LBT).

However, the NR-U technology is silent on a scheme for determining a Type0-PDCCH monitoring occasion. In the NR-U technology, LBT failure may occur to the network device. In this case, if a scheme of the NR technology is adopted to determine a Type0-PDCCH monitoring occasion corresponding to each SSB, that is, for each SSB, the terminal device monitors a PDCCH on a Type0-PDCCH monitoring occasion corresponding to the SSB, the power consumption of the terminal device may be increased.

SUMMARY

In a first aspect, a method for physical downlink control channel (PDCCH) detection is provided. The method includes the following. At least one candidate position of a first synchronization signal block (SSB) is determined, where SSBs at the at least one candidate position are quasi co-located (QCL). A PDCCH monitoring occasion corresponding to the at least one candidate position is determined. A PDCCH is detected on the PDCCH monitoring occasion.

In a second aspect, a method for PDCCH transmission is provided. The method includes the following. At least one candidate position of a first SSB is determined, where SSBs at the at least one candidate position are QCL. A PDCCH monitoring occasion corresponding to the at least one candidate position is determined. A PDCCH is transmitted on the PDCCH monitoring occasion.

In a third aspect, a terminal device is provided. The terminal device includes a processor and a memory. The memory is configured to store computer programs. The processor is configured to invoke and execute the computer programs stored in the memory, to determine at least one candidate position of a first SSB, SSBs at the at least one candidate position being QCL, determine a PDCCH monitoring occasion corresponding to the at least one candidate position, and detect a PDCCH at the PDCCH monitoring occasion.

In a fourth aspect, a network device is provided. The network device includes a processor and a memory. The memory is configured to store computer programs. The processor is configured to invoke and execute the computer programs stored in the memory, to determine at least one candidate position of a first SSB, SSBs at the at least one candidate position being QCL, determine a PDCCH monitoring occasion corresponding to the at least one candidate position, and transmit a PDCCH at the PDCCH monitoring occasion.

DETAILED DESCRIPTION

The following will describe technical solutions of implementations with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

Figure 1:
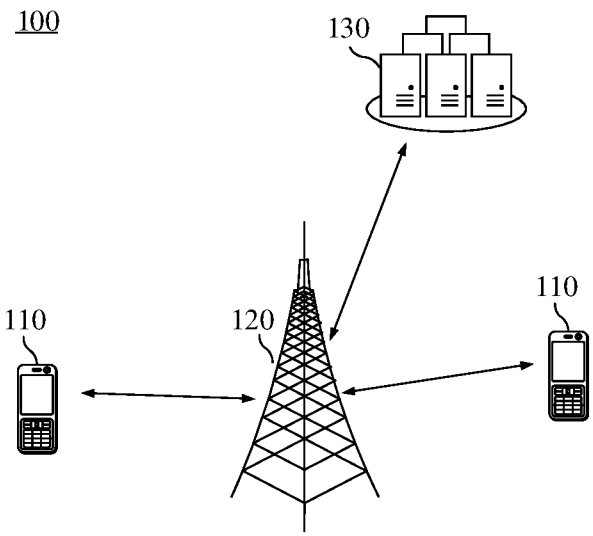
FIG. 1 illustrates an exemplary application scenario according to the present disclosure.

FIG. 1 is a schematic diagram of an application scenario according to implementations of the present disclosure.

As illustrated in FIG. 1, a communication system 100 may include a terminal device 110 and a network device 120. The network device 120 may communicate with the terminal device 110 via an air interface. The terminal device 110 and the network device 120 support a multi-service transmission.

It should be understood that, in implementations of the present disclosure, the communication system 100 is used simply for exemplary description rather than limitation. That is, the technical solutions of implementations of the present disclosure are applicable to various communication systems, for example, a long term evolution (LTE) system, an LTE time division duplex (LTE-TDD) system, a universal mobile telecommunication system (UMTS), a 5th generation (5G) communication system, also known as a new radio (NR) communication system, or a future communication system.

In the communication system 100 illustrated in FIG. 1, the network device 120 may be an access network device in communication with the terminal device 110. The access network device may provide communication coverage for a specific geographic area, and may communicate with the terminal device 110, for example, a user equipment (UE), located in the coverage area.

The network device 120 may be an evolutional node B (eNB or eNodeB) in an LTE system, a next generation radio access network (NG RAN) device, a gNB in an NR system, or a radio controller in a cloud radio access network (CRAN). Alternatively, the network device 120 may be a relay station, an access point, an in-vehicle device, a wearable device, a hub, a switch, a bridge, a router, a network device in a future evolved public land mobile network (PLMN).

The terminal device 110 may be any terminal device, which includes, but is not limited to, a terminal device connected to the network device 120 or another terminal device via a wire or wireless connection.

For example, the terminal device 110 may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved network, etc.

Terminal devices 110 can communicate with one another through device to device (D2D) communication.

The wireless communication system 100 may also include a core network device 130 in communication with a base station. The core network device 130 may be a 5G core network (5GC) device, for example, an access and mobility management function (AMF), an authentication server function (AUSF), a user plane function (UPF), or a session management function (SMF). Optionally, the core network device 130 may also be an evolved packet core (EPC) device of an LTE network, for example, a session management function+core packet gateway (SMF+PGW-C) device. It should be understood that, the SMF+PGW-C device can realize functions of both SMF and PGW-C. With the evolution of the network, the core network device mentioned-above may also be called by other names, or a new network entity may be formed by dividing functions of the core network, which is not limited herein.

Various functional units in the communication system 100 may establish a connection with one another via a next generation network (NG) interface for communication.

For example, a terminal device establishes an air interface connection with an access network device via an NR interface for transmitting user-plane data and a control-plane signaling. The terminal device can establish a control-plane signaling connection with an AMF via NG interface 1 ("N1" for short). Access network device, such as a next generation wireless access base station (gNB), can establish a user-plane data connection with a UPF via NG interface 3 ("N3" for short). The access network device can establish a control-plane signaling connection with the AMF via NG interface 2 ("N2" for short). The UPF can establish a control-plane signaling connection with a SMF via NG interface 4 ("N4" for short). The UPF can exchange user-plane data with a data network via NG interface 6 ("N6" for short). The AMF can establish a control-plane signaling connection with the SMF via NG interface 11 ("N11" for short). The SMF can establish a control-plane signaling connection with a PCF via NG interface 7 ("N7" for short).

FIG. 1 exemplarily illustrates one base station, one core network device, and two terminal devices. Optionally, the wireless communication system 100 may include multiple base stations, and there can be other numbers of terminal devices in a coverage area of each of the base stations, which is not limited herein.

It should be understood that, according to implementations of the present disclosure, a device with communication functions in a network/system can be referred to as a "communication device". Taking the communication system 100 illustrated in FIG. 1 as an example, the communication device may include the network device 120 and the terminal device(s) 110 that have communication functions. The network device 120 and the terminal device(s) 110 can be the devices described above and will not be repeated herein. The communication device may further include other devices such as a network controller, a mobile management entity, or other network entities in the communication system 100, which is not limited herein.

As an example, the communication system 100 may be applicable to an NR-U communication network.

In other words, the terminal device 110 or the network device 120 may be applicable to an NR-U network. NR works in an unlicensed frequency band. The unlicensed frequency band is also be referred to as an unlicensed spectrum.

Unlicensed spectrum is a spectrum specified by a country or region that can be used for communication between radio devices. This spectrum is usually regarded as a shared spectrum, that is, communication devices in different communication systems can use this spectrum without applying for exclusive spectrum authority from the government, as long as they meet regulatory requirements on this spectrum set by the country or region. In order to make various communication systems, which use an unlicensed spectrum for wireless communication, coexist in harmony in this spectrum, some countries or regions have specified regulatory requirements on use of unlicensed spectrum.

For example, in European regions, a communication device needs to follow a "listen-before-talk (LBT)" principle, that is, before transmitting signals on an unlicensed spectrum channel, the communication device needs to perform channel listening first, and the communication device can transmit signals only when the channel listening indicates that the channel is idle. If the channel listening of the communication device on the unlicensed spectrum channel indicates that the channel is busy, the communication device cannot transmit signals. In order to ensure fairness, in one transmission, a duration for which the communication device uses the unlicensed spectrum channel for signal transmission cannot exceed a maximum channel occupation time (MCOT).

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In the new radio (NR) technology, if a synchronization signal block (SSB) and a type0-physical downlink control channel (Type0-PDCCH) control resource set (CORESET) are multiplexed in pattern 1, a Type0-PDCCH monitoring occasion can be uniquely determined according to an SSB index and a monitoring occasion related parameter.

In other words, Type0-PDCCH monitoring occasions are in one-to-one correspondence with SSBs.

In the new radio in unlicensed spectrum (NR-U) technology, a network device can transmit SBBs at multiple candidate positions within a discovery reference signal (DRS) transmission window according to a result of listen before talk (LBT).

However, the NR-U technology is silent on a scheme for determining a Type0-PDCCH monitoring occasion. In the NR-U technology, LBT failure may occur to the network device. In this case, if a scheme of the NR technology is adopted to determine a Type0-PDCCH monitoring occasion corresponding to each SSB, that is, for each SSB, the terminal device monitors a PDCCH on a Type0-PDCCH monitoring occasion corresponding to the SSB, the power consumption of the terminal device may be increased.

Therefore, how to reduce the power consumption of the terminal device in monitoring a PDCCH is a technical problem in this field.

A method for PDCCH detection is provided in the present disclosure. Candidate positions of multiple SSBs in a quasi co-located (QCL) relationship are mapped to at least one PDCCH monitoring occasion. In this way, the number of times a terminal device monitors a PDCCH can be reduced, thereby reducing the power consumption of the terminal device. In addition, the number of time slots in the PDCCH monitoring occasion can also be increased, thereby appropriately increasing PDCCH transmission occasions and reducing the impact of LBT on PDCCH transmission.

Figure 2:
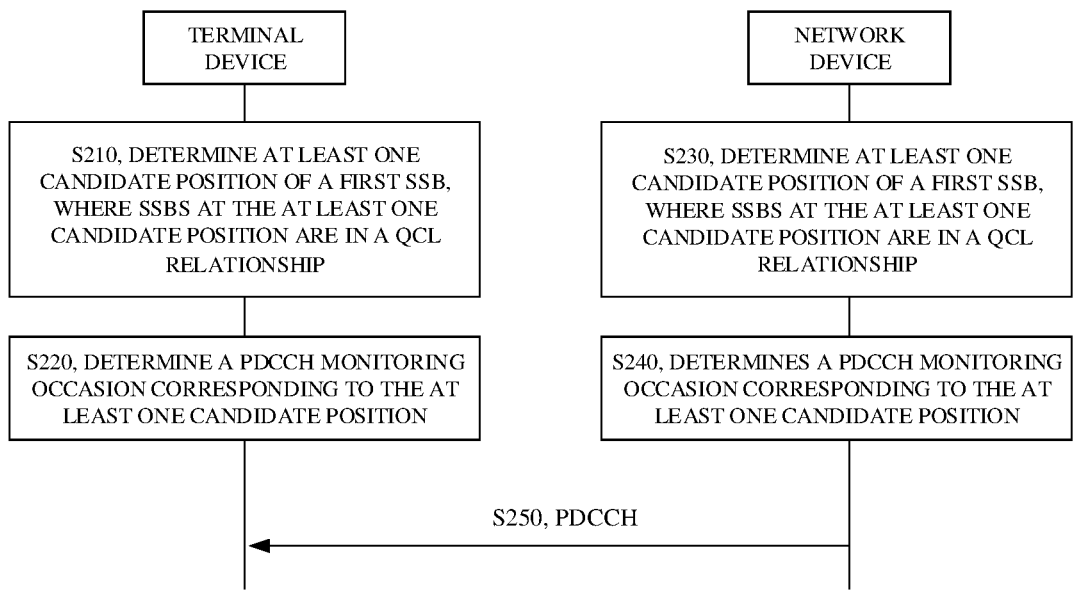
FIG. 2 is a schematic flowchart of a method according to implementations of the present disclosure.

FIG. 2 illustrates a schematic flowchart of a method 200 according to implementations of the present disclosure. The method 200 may be performed via the interaction between a network device and a terminal device. The terminal device illustrated in FIG. 2 may be the terminal device illustrated in FIG. 1, and the network device illustrated in FIG. 2 may be the access network device illustrated in FIG. 1.

Referring to FIG. 2, the method 200 includes some or all of the following operations.

At S210, the terminal device determines at least one candidate position of a first SSB (or referred to as a PBCH block), where SSBs at the at least one candidate position have a QCL relationship.

At S220, the terminal device determines a PDCCH monitoring occasion corresponding to the at least one candidate position.

At S250, the terminal device detects on the PDCCH monitoring occasion a PDCCH transmitted by the network device.

For example, after receiving the first SSB, the terminal device may first determine at least one candidate position of the first SSB, and then candidate positions of multiple SSBs in a QCL relationship are mapped to at least one PDCCH monitoring occasion. In this way, the number of times the terminal device monitors the PDCCH can be reduced, thereby reducing the power consumption of the terminal device.

When the method 200 is applicable to NR-U, by reducing the number of times the terminal device monitors the PDCCH, LBT failure can be reduced, thereby reducing the power consumption of the terminal device.

In addition, when the number of the at least one candidate position is increased, the number of time slots in the PDCCH monitoring occasion can also be increased, thereby appropriately increasing PDCCH transmission occasions and reducing the impact of LBT on PDCCH transmission.

To facilitate the understanding of the solution of the present disclosure, SSBs and candidate positions of the SSBs will be described in detail below with reference to FIGS. 3 to 6.

For common channels and signals, such as synchronization signals (SS) and broadcast channels, a network device needs to cover a whole cell through multi-beam scanning to facilitate reception by a terminal device in the cell. Multi-beam transmission of an SS can be implemented by defining an SSB burst set. One SSB burst set contains one or more SSBs. One SSB is used for carrying SSs and broadcast channels of one beam. Therefore, one SSB burst set may contain SSs of beams, where the number of the beams is equal to the number of SSBs in the cell ("SSB number" for short).

In the method 200, the first SSB may be any SSB in an SSB burst set.

A maximum SSB number, represented by L, is related to a frequency band of a system.

For example, for a frequency band lower than 3 GHz (gigahertz), the maximum SSB number L may be equal to 4. For a frequency band from 3 GHz to 6 GHz, the maximum SSB number L may be equal to 8. For a frequency band from 6 GHz to 52.6 GHz, the maximum SSB number L may be equal to 64.

Figure 3:
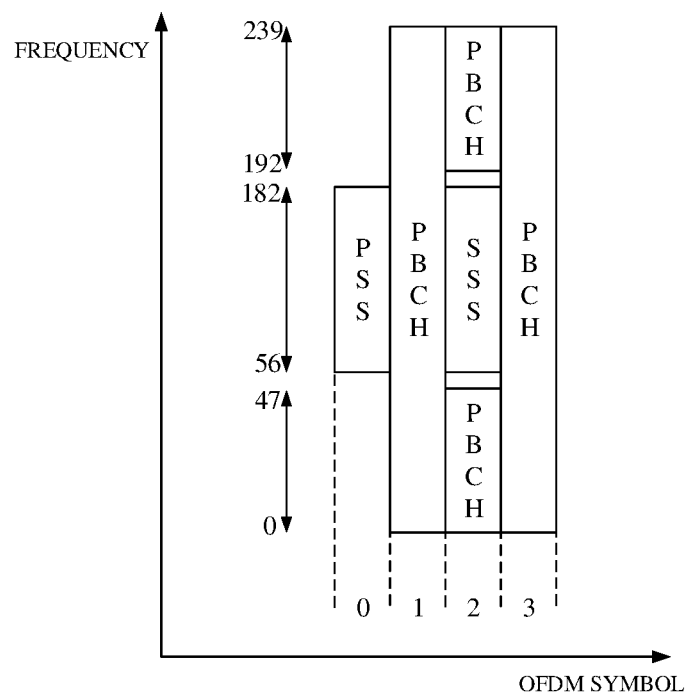
FIG. 3 is a schematic block diagram of a synchronization signal block (SSB) according to implementations of the present disclosure.

As illustrated in FIG. 3, one SSB may contain a primary synchronization signal (PSS) of one symbol, a secondary synchronization signal (SSS) of one symbol, and new radio access technology-physical broadcast channels (NR-PBCH) of two orthogonal frequency division multiplexing (OFDM) symbols. Time-frequency resources occupied by a PBCH may include a demodulation reference signal (DMRS) that is used for demodulation of the PBCH.

All SSBs in the SSB burst set can be transmitted within a time window with a size of 5 ms (millisecond) ("5 ms time window" for short), and can be transmitted repeatedly at a certain period, for example, can be transmitted repeatedly within 5 ms at a certain period. The period can be configured through a higher layer parameter, i.e., SSB-timing. The period can be 5 ms, 10 ms, 20 ms, 40 ms, 80 ms, 160 ms, etc.

In some implementations of the present disclosure, an SSB distribution pattern may be different under different subcarrier spacings (SCS).

Figure 4:
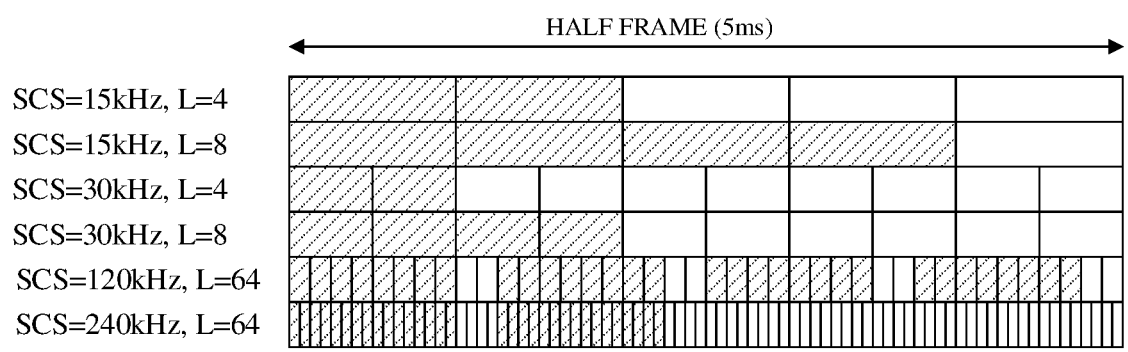
FIG. 4 is a schematic block diagram of a distribution mode of SSBs according to implementations of the present disclosure.

As illustrated in FIG. 4, taking a 15 kHz (kilohertz) SCS and L=4 as an example, one slot contains 14 symbols and can carry two SSBs. 4 SSBs are distributed in first two slots in a 5 ms time window.

L represent the maximum number of SSBs, and the number of SSBs actually transmitted may be less than L.

Positions of the SSBs actually transmitted can be notified to the terminal device via system information in the form of a bitmap. The number and positions of the SSBs actually transmitted are determined by the network device. According to an SSB received, the terminal device can obtain a candidate position of the SSB. The candidate position of the SSB corresponds to a relative position of the SSB in a time window, for example, a 5 ms time window, that is, to an index or number of the candidate position where the SSB is located. The index of the candidate position of the SSB can be indicated by a DMRS of a PBCH or information carried in the PBCH.

For example, in a frequency band below 6 GHz of a licensed spectrum, the maximum number of SSBs included in the SSB burst is 8, and the value range of the index of the candidate position of the SSB is 0-7.

In some implementations of the present disclosure, the index of the candidate position of the SSB can be used for the terminal device to obtain frame synchronization and a QCL relationship.

The position of the SSB in a radio frame can be obtained according to the index of the candidate position of the SSB and a half-frame indication, thereby obtaining the frame synchronization.

For the QCL relationship, two antenna ports are said to be quasi co-located if a large-scale property of a channel over which a symbol on one antenna port is conveyed can be inferred from that of a channel over which a symbol on the other antenna port is conveyed. The large-scale property includes one or more of delay spread, Doppler spread, Doppler shift, average gain, average delay, and spatial reception (Rx) parameter.

In other words, when two reference signals (such as SSBs) are in a QCL relationship, it can be considered that a large-scale property, such as a Doppler delay, an average delay, a spatial Rx parameter, etc., of each of the two reference signals can be inferred from each other, or can be considered similar to each other. The terminal device can filter SSBs that are in a QCL relationship to obtain a beam-lever measurement result.

The network device may transmit a discovery reference signal (DRS) to the terminal device for access and measurement. The DRS may include the SSB.

Due to uncertainty of getting channel usufruct on an unlicensed spectrum, that is, there may be LBT failure during SSB transmission, the network device may be unable to successfully transmit the SSB at a preset time point.

In some implementations of the present disclosure, SSB transmission occasions can be increased to ensure the transmission success rate.

For example, in a DRS transmission window, the number Y of SSB candidate positions configured by the network device may be greater than the number X of SSBs actually transmitted by the network device. For example, the maximum number of SSBs is 8, and the value range of the index of the candidate position of the SSB is 0-15.

In other words, for each DRS transmission window, the network device may determine to use X available candidate positions among Y candidate positions to transmit the DRS according to an LBT detection result in the DRS transmission window.

For example, assuming that the DRS transmission window has a size of 5 ms and the maximum number of SSB transmission is 4, within the 5 ms time window, for an SCS of 15 kHz, there are Y=10 candidate positions, and for an SCS of 30 kHz, there are Y=20 candidate positions.

Figure 5:
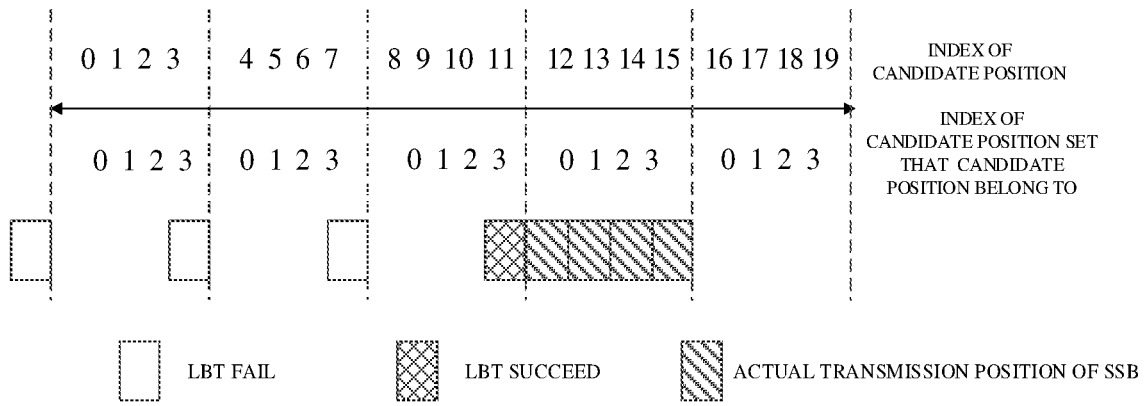
FIG. 5 is a schematic block diagram of a transmission mode of SSBs according to implementations of the present disclosure.

As illustrated in FIG. 5, when LBT performed by the network device before a candidate position with index 12 succeeds, the network device starts to transmit SSB indexes 0-3. According to the moment when the LBT succeeds, an actual transmission position of the SSB may be any one of the Y candidate positions.

Taking L=4 and Y=20 as an example, since up to 4 SSBs may be transmitted at 20 candidate positions, position indexes of candidate positions where the SSBs may be located can be set from 0 to Y−1, so that after receiving an SSB, the terminal device can determine the candidate positions of the SSB and further obtain frame synchronization.

In addition, after obtaining an index of a candidate position where the SSB is located through the SSB received, the terminal device may further obtain QCL relationship information of the SSB based on the index of the candidate position where the SSB is located. For example, SSBs at candidate positions of which indexes mod Q are the same can be determined as being in a QCL relationship. For another example, the QCL relationship information of the SSB can be obtained according to the lowest three bits of the index of the candidate position, i.e., a PBCH DMRS sequence index. That is, SSBs of which PBCH DMRS sequence indexes mod Q are the same can be determined as being in a QCL relationship.

Figure 6:
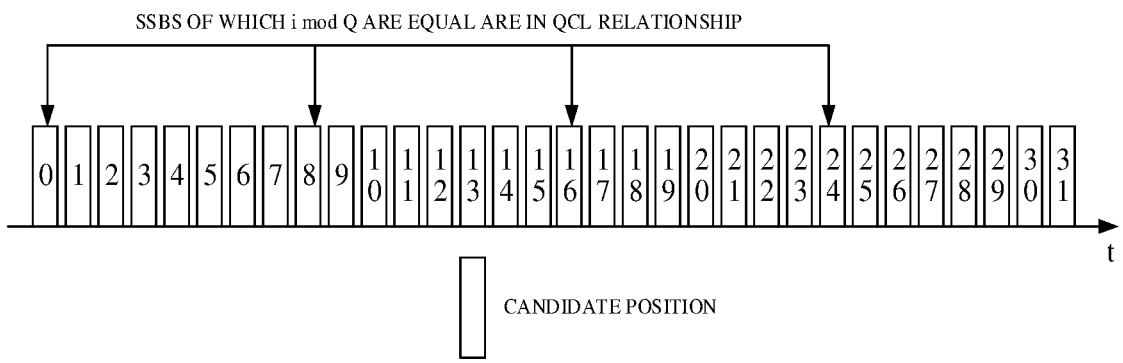
FIG. 6 is a schematic block diagram of a distribution mode of multiple SSBs in a quasi co-located (QCL) relationship according to implementations of the present disclosure.

As illustrated in FIG. 6, taking Q=8 as an example, SSBs at candidate positions with indexes 0, 8, 16, and 24 are in a QCL relationship.

Therefore, for an SSB of a certain beam, a specific position where the SSB is located can be determined from Y candidate positions according to indexes of the candidate positions. A parameter Q for determining QCL information of the SSB can be carried on a PBCH, in a system message, or be predefined. After receiving the SSB, the terminal device can obtain the QCL information of the SSB according to the received Q and the indexes of the candidate positions. SSBs in a QCL relationship can be jointly processed to improve performance.

In the method 200, SSBs at the at least one candidate position are in a QCL relationship.

A PDCCH monitoring occasion is described below.

The terminal device receives on time-frequency resources information or a channel transmitted by the network device. For example, the time-frequency resources may include a resource set defined by a control resource set (CORESET). The terminal device detects a PDCCH in the resource set defined by the CORESET, to obtain scheduling information of the PDSCH carrying data.

As an example rather than a limitation, the time-frequency resources may include resources for carrying control information. The control information may include common control information transmitted to multiple terminal devices and/or dedicated control information for one terminal device.

In other words, the time-frequency resources may include a search space. The search space may include a common search space for carrying common control information, for example, cell-level control information. The search space may also include a UE-specific search space for carrying dedicated control information, for example, UE-level control information.

For a terminal device performing initial access, the terminal device can receive common control information, such as a SIB1, in a common search space. The common search space for receiving the SIB1 may also be referred to as a Type0-PDCCH common search space. The common search space includes a CORESET and a monitoring occasion. Corresponding indication information may be carried in pdcch-ConfigSIB1 information in a PBCH. The pdcch- ConfigSIB1 information may include Type0-PDCCH CORESET information and PDCCH monitoring occasion information.

In the method 200, after receiving the first SSB, the terminal device may determine multiple candidate positions in a QCL relationship based on indexes of the candidate positions of the first SSB, and then determine at least one PDCCH monitoring occasion corresponding to the multiple candidate positions. In this way, the number of times the terminal device monitors the PDCCH can be reduced, thereby reducing the power consumption of the terminal device.

In some implementations of the present disclosure, the at least one candidate position corresponds to a same PDCCH monitoring occasion.

In other words, an index of the at least one candidate position can be associated with the same PDCCH monitoring occasion. In this way, the number of times the terminal device monitors the PDCCH can be reduced, thereby reducing the power consumption of the terminal device.

In some implementations of the present disclosure, the at least one candidate position belongs to a same candidate position set.

For example, the candidate position set may include a candidate position where the first SSB is located and candidate positions where SSBs in a QCL relationship with the first SSB are located.

With reference to FIG. 6, taking Q=8 as an example, SSBs at candidate positions with indexes 0, 8, 16, and 24 are in a QCL relationship. Assuming that the first SSB is at a candidate position with index 0, the candidate position set may include candidate positions with indexes 0, 8, 16, and 24.

It can be seen from the above that, after obtaining the index of the candidate position where the SSB is located through the SSB received, the terminal device may obtain QCL relationship information of the SSB based on the index of the candidate position where the SSB is located. For example, SSBs at candidate positions of which indexes mod Q are the same can be determined as being in a QCL relationship. For another example, the QCL relationship information of the SSB can be obtained according to the lowest three bits of the index of the candidate position, i.e., a PBCH DMRS sequence index. That is, SSBs of which PBCH DMRS sequence indexes mod Q are the same can be determined as being in a QCL relationship.

For ease of description, in implementations of the present disclosure, a set of candidate positions where SSBs in a QCL relationship are located can be referred to as a candidate position set. A number or index of the candidate position set is defined as a result of candidate position indexes mod Q or PBCH DMRS sequence indexes mod Q.

In S220, as an example, the terminal device may first determine a set number of the candidate position set that the at least one candidate position belongs to, and then determine the PDCCH monitoring occasion according to the set number.

For example, the terminal device may determine the set number according to the following formula:

$$j = i \bmod Q,$$

where j represents the set number, i represents a position index of a candidate position among the at least one candidate position, Q represents a parameter for determining a QCL relationship of the first SSB, and mod represents a modulo operator.

For another example, the terminal device may determine the set number according to the following formula:

$$j = DMRS_{\_i} \bmod Q,$$

where j represents the set number, $DMRS_{\_i}$ represents a DMRS sequence index in an SSB at a candidate position among the at least one candidate position, Q represents a parameter for determining a QCL relationship of the first SSB, and mod represents a modulo operator.

In other words, after receiving SSBs in a QCL relationship at multiple candidate positions, the terminal device can determine a Type0-PDCCH monitoring occasion associated with the first SSB according to the index of the candidate position where the first SSB is actually received or the DMRS sequence index in the first SSB. Indexes of candidate positions of multiple SSBs in a QCL relationship or DMRS sequence indexes in the multiple SSBs are associated with a same Type0-PDCCH monitoring occasion. In this way, the number of times the terminal device monitors the PDCCH can be reduced, thereby reducing the power consumption of the terminal device.

Further, the terminal device may determine the PDCCH monitoring occasion according to the set number as follows. The terminal device may first determine a first time slot according to the set number, then determine a first radio frame according to the set number, and finally determine the first time slot in the first radio frame and/or one or more time slots subsequent to the first time slot as the PDCCH monitoring occasion.

For example, the terminal device may determine the first time slot according to the following formula:

$$n_0 = (O \cdot 2^\mu + \lfloor j \cdot M \rfloor) \bmod N_{slot}^{frame,\mu},$$

where $n_0$ represents a number of the first time slot, $N_{slot}^{frame,\mu}$ represents the quantity of time slots in a radio frame, M and O are parameters in system information, a value of $\mu$ is determined according to a subcarrier spacing of the PDCCH, j represents the set number, mod represents a modulo operator, and $\lfloor \ \rfloor$ represents a floor operator. For example, M and O are part of pdcch-ConfigSIB1 information in a PBCH. In a frequency band below 6 GHz, the value of O may include {0, 2, 5, 7}. In a frequency band above 6 GHz, the value of O may include {0, 2.5, 5, 7.5}. The value of M may include {½, 1, 2}. The value of $\mu$ may include {0, 1, 2, 3}.

For example, an even numbered radio frame is determined as the first radio frame when $\lfloor (O \cdot 2^\mu + \lfloor j \cdot M \rfloor) / N_{slot}^{frame,\mu} \rfloor \bmod 2 = 0$.

For another example, an odd numbered radio frame is determined as the first radio frame when $\lfloor (O \cdot 2^\mu + \lfloor j \cdot M \rfloor) / N_{slot}^{frame,\mu} \rfloor \bmod 2 = 1$.

$n_0$ represents a number of the first time slot, $N_{slot}^{frame,\mu}$ represents the quantity of time slots in a radio frame, M and O are parameters in system information, a value of $\mu$ is determined according to a subcarrier spacing of the PDCCH, j represents the set number, mod represents a modulo operator, and $\lfloor \ \rfloor$ represents a floor operator.

In other words, when the quantity of time slots calculated according to $(O \cdot 2^\mu + \lfloor j \cdot M \rfloor)$ is less than the quantity of time slots in a radio frame, the terminal device may determine the first radio frame as an even numbered radio frame. When the quantity of time slots calculated according to $(O \cdot 2^\mu + \lfloor j \cdot M \rfloor)$ is greater than or equal to the quantity of time slots in a radio frame, the terminal device may determine the first radio frame as an odd numbered radio frame.

As an example, the terminal device may determine the first time slot in the first radio frame and/or one or more consecutive time slots subsequent to the first time slot as the PDCCH monitoring occasion. Alternatively, the terminal device may determine the first time slot in the first frame and/or one or more time slots, which are subsequent to the first time slot and have a preset distance from the first time slot, as the PDCCH monitoring occasion.

For example, after determining the number of the first time slot of the monitoring occasion, the terminal device monitors a Type0-PDCCH in N consecutive time slots, where the N consecutive time slots may include the first time slot. In NR, N=2. In an NR-U system, the number of time slots in a monitoring occasion can be consistent with NR, that is, N=2, or can be different from NR. For example, N can take a predefined value greater than 2, for example, N=4.

In NR-U, there are multiple candidate positions for a transmission position of an SSB. For the transmission of a Type0-PDCCH and a SIB1, setting a longer monitoring occasion can help to counter a situation where the Type0-PDCCH cannot be transmitted due to possible LBT failure. Further, the number N of time slots in a Type0-PDCCH monitoring occasion may be associated with a parameter Q. For example, under a certain DRS transmission window length, the value of Q is related to the number of SSB transmission occasions of each beam. The smaller the Q, the more SSB candidate positions of each beam. In this case, the number N of time slots in the Type0-PDCCH monitoring occasion may also be increased. In contrast, the larger the Q, the fewer SSB candidate positions of each beam. In this case, the number N of time slots in the Type0-PDCCH monitoring occasion may also be reduced.

In some implementations of the present disclosure, one candidate position set may correspond to one PDCCH monitoring occasion.

For example, one candidate position set in a DRS transmission window may correspond to one PDCCH monitoring occasion.

Figure 7:
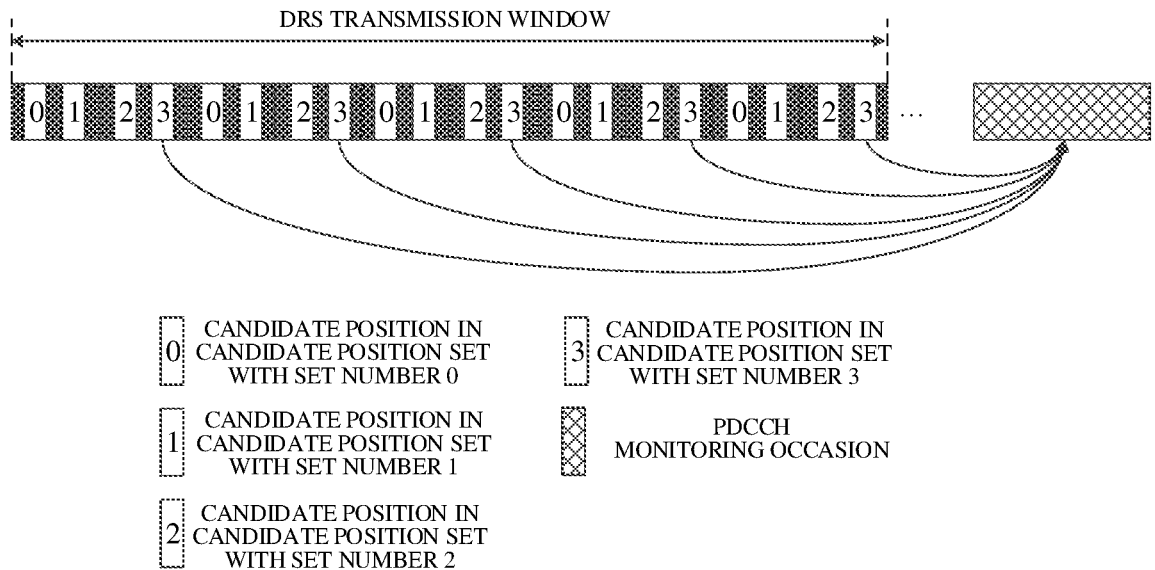
FIGS. 7 to 13 are schematic block diagrams of a positional relationship between at least one candidate position of an SSB and a physical downlink control channel (PDCCH) monitoring occasion according to implementations of the present disclosure.

As illustrated in FIG. 7, as an example, a candidate position set with set number 3 in a DRS transmission window corresponds to a PDCCH monitoring occasion. In other words, all candidate positions in the candidate position set with set number 3 may correspond to a PDCCH monitoring occasion.

In some implementations of the present disclosure, one candidate position set may correspond to multiple PDCCH monitoring occasions. Optionally, the number of candidate positions in the candidate position set may be greater than the number of the multiple PDCCH monitoring occasions.

For example, one candidate position set in a DRS transmission window may correspond to multiple PDCCH monitoring occasions.

Figure 8:
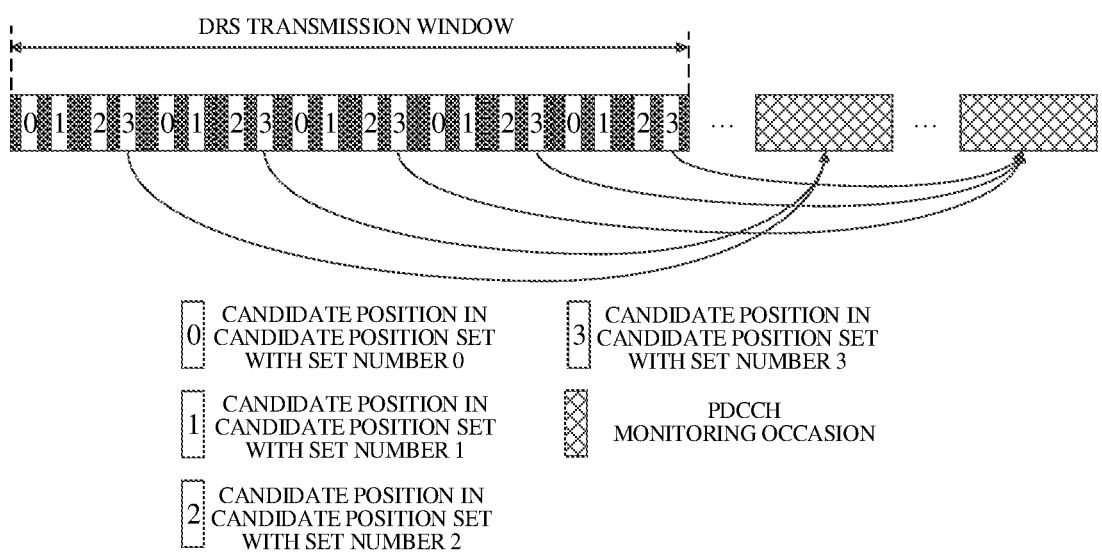

As illustrated in FIG. 8, as an example, a candidate position set with set number 3 in a DRS transmission window corresponds to two PDCCH monitoring occasions. That is, the first and second candidate positions in the candidate position set with set number 3 correspond to one PDCCH monitoring occasion, and the third to fifth candidate positions in the candidate position set with set number 3 correspond to the other PDCCH monitor occasion.

By keeping SSBs transmitted at multiple SSB candidate positions in a QCL relationship corresponding to or associated with the same PDCCH monitoring occasion, the number of times the terminal device monitors the PDCCH can be reduced, thereby reducing the power consumption. In addition, the number of time slots in a monitoring occasion can be increased, thereby appropriately increasing PDCCH transmission occasions and reducing the impact of LBT on PDCCH transmission.

It should be understood that, in implementations of the present disclosure, when the first time slot is determined according to $n_0 = (O \cdot 2^\mu + \lfloor j \cdot M \rfloor) \bmod N_{slot}^{frame,\mu}$ or the set number of the candidate position set, the first time slot may be located outside or within a DRS transmission window that a candidate position of the first SSB belongs to. Therefore, the PDCCH monitoring occasion corresponding to the at least one candidate position may be located outside or within the DRS transmission window that the candidate position of the first SSB belongs to, which is not limited herein.

In some other implementations of the present disclosure, the terminal device may directly determine at least one time slot among time slots where the at least one candidate position is located as the PDCCH monitoring occasion.

For example, the PDCCH monitoring occasion corresponding to the at least one candidate position includes only one of the time slots where the at least one candidate position is located. That is, each of the at least one candidate position is associated with the time slot.

Figure 9:
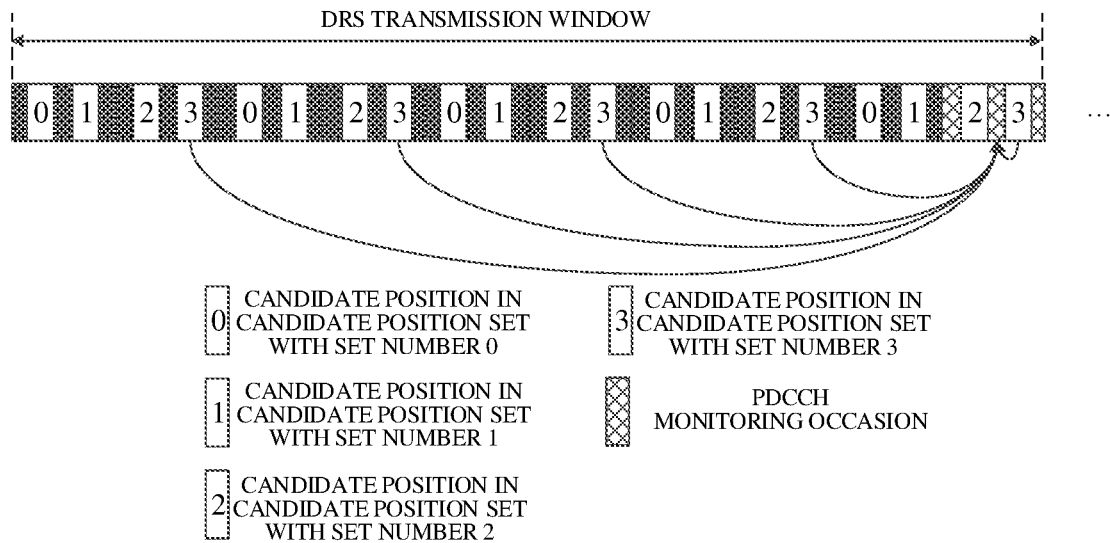

As illustrated in FIG. 9, as an example, a PDCCH monitoring occasion corresponding to a candidate position set with set number 3 in a DRS transmission window includes only one time slot.

For example, the PDCCH monitoring occasion corresponding to the at least one candidate position may include multiple time slots among the time slots where the at least one candidate position is located. In this case, each of the at least one candidate position may be associated with each of the multiple time slots, or the at least one candidate position may be respectively associated with the multiple time slots.

Figure 10:
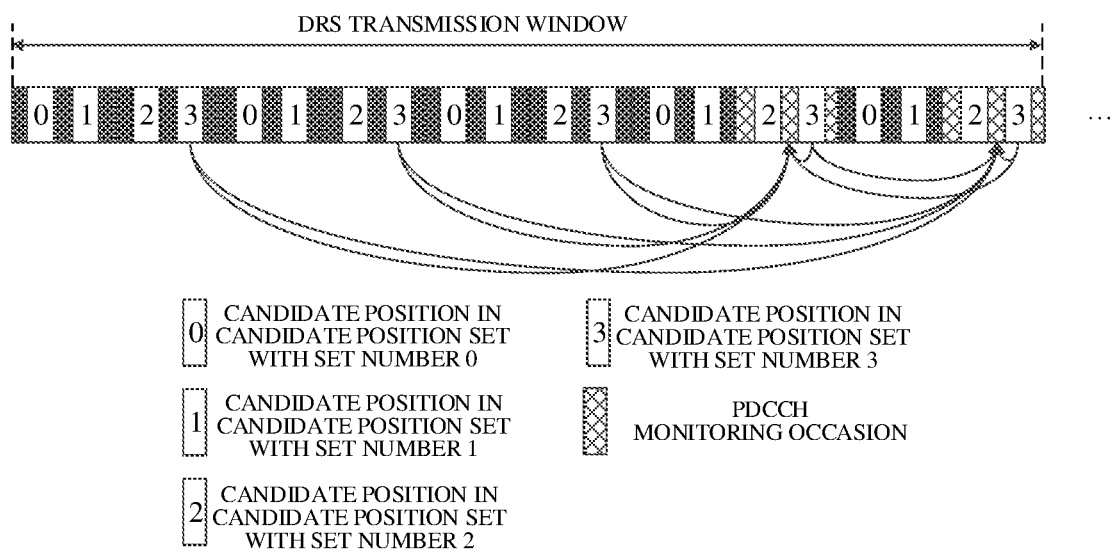

As illustrated in FIG. 10, as an example, a PDCCH monitoring occasion corresponding to a candidate position set with set number 3 in a DRS transmission window includes only two time slots. That is, each candidate position in the candidate position set with set number 3 is associated with these two time slots.

Figure 11:
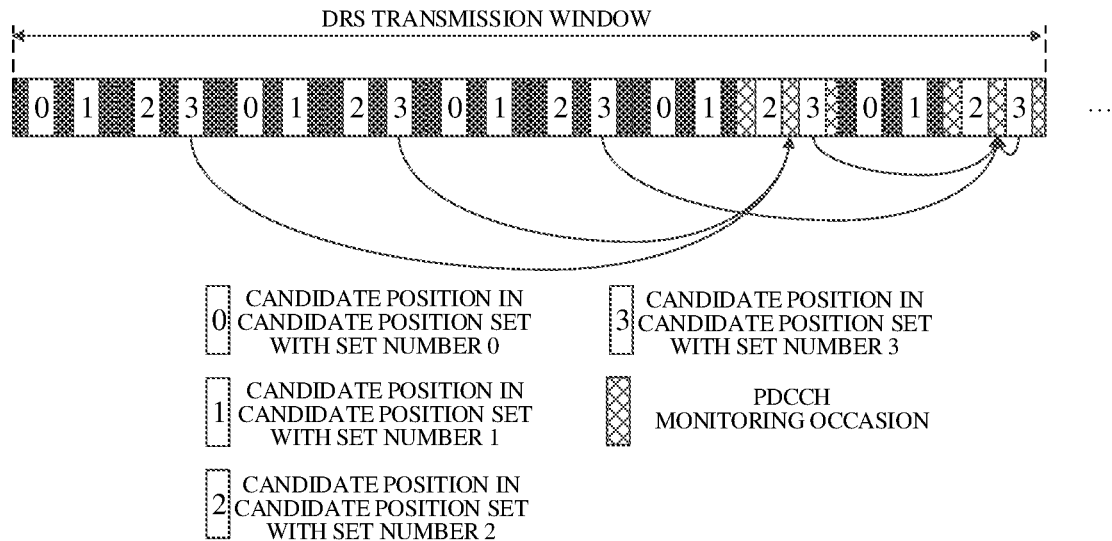

As illustrated in FIG. 11, as an example, a PDCCH monitoring occasion corresponding to a candidate position set with set number 3 in a DRS transmission window includes only two time slots. That is, the first and second candidate positions in the candidate position set with set number 3 are associated with the first time slot among these two time slots, and the third to fifth candidate positions in the candidate positions set with set number 3 are associated with the second time slot among these two time slots.

By directly determining the at least one time slot among the time slots where the at least one candidate position is located as the PDCCH monitoring occasion, the PDCCH monitoring occasion is more likely to be in the same channel occupation time (COT) as an SSB transmission. In this way, the possibility of successful PDCCH transmission can be increased and the impact of LBT on PDCCH transmission can be reduced. In addition, this avoids the need to re-perform LBT to obtain channel occupation for transmitting a PDCCH which is caused by a fact that the Type0-PDCCH monitoring occasion is outside the DRS transmission window, thereby effectively reducing the power consumption of the terminal device.

In some implementations of the present disclosure, the terminal device may directly determine the at least one time slot among the time slots where the at least one candidate position is located as the PDCCH monitoring occasion as follows. The terminal device may first determine a second time slot among the time slots where the at least one candidate position is located, and then determine the second time slot and/or one or more time slots subsequent to the second time slot among the time slots where the at least one candidate position is located as the PDCCH monitoring occasion.

An SSB transmission period can be configured, for example, as 5 ms, 10 ms, 20 ms, 40 ms, 80 ms, 160 ms, and a monitoring period of a search space of a Type0-PDCCH may be configured differently, for example, as 20 ms. Therefore, when a period of a DRS transmission window is less than 20 ms, a time slot where a Type0-PDCCH monitoring occasion is located is only in a corresponding time slot of a part of the DRS transmission window. When the period of the DRS transmission window is greater than 20 ms, a part of the time slot where the Type0-PDCCH monitoring occasion is located is in the corresponding time slot of the DRS transmission window, and the other part may be located in a corresponding time slot of a non-DRS transmission window.

In other words, the SSB transmission period (a DRS transmission window with a period of 20 ms) may be equal to the monitoring period of the search space of the Type0-PDCCH. In this case, the Type0-PDCCH monitoring occasion may be a corresponding time slot of the DRS transmission window.

In some implementations of the present disclosure, the Type0-PDCCH monitoring occasion can be determined in a predefined manner.

For example, in the DRS transmission window, the Type0-PDCCH monitoring occasion may be located in a predefined position in time slots where multiple SSB candidate positions in a QCL relationship are located. For example, in the DRS transmission window, the Type0-PDCCH monitoring occasion is located in a time slot later in time among the time slots where the multiple SSB candidate positions in a QCL relationship are located.

In other words, the second time slot can be determined in a predefined manner. For example, the second time slot is the last time slot or the first time slot among the time slots where the at least one candidate position is located.

For example, the second time slot is the first time slot among the time slots where the at least one candidate position is located. The time slot where the PDCCH monitoring occasion is located may include the first time slot and/or one or more time slots subsequent to the first time slot among the time slots where the at least one candidate position is located.

For another example, the second time slot is the last time slot among the time slots where the at least one candidate position is located. The time slot where the PDCCH monitoring occasion is located may include the last time slot.

In some other implementations of the present disclosure, a candidate position where an SSB is detected may be determined as the second time slot. In other words, the terminal device receives the first SSB, and determines a time slot where the candidate position of the first SSB is located as the second time slot.

In the DRS transmission window, the network device needs to perform LBT to obtain channel occupation for transmitting an SSB. In the DRS transmission window, if the Type0-PDCCH monitoring occasion is located in one or more of time slots where multiple candidate positions in a QCL relationship are located, the terminal device can determine the Type0-PDCCH monitoring occasion according to an SSB detection result. For example, the terminal device may determine the following time slot as the Type0-PDCCH monitoring occasion: the time slot is subsequent to a time slot where an SSB is detected, and candidate positions in a QCL relationship with the SSB are located in the time slot.

Figure 12:
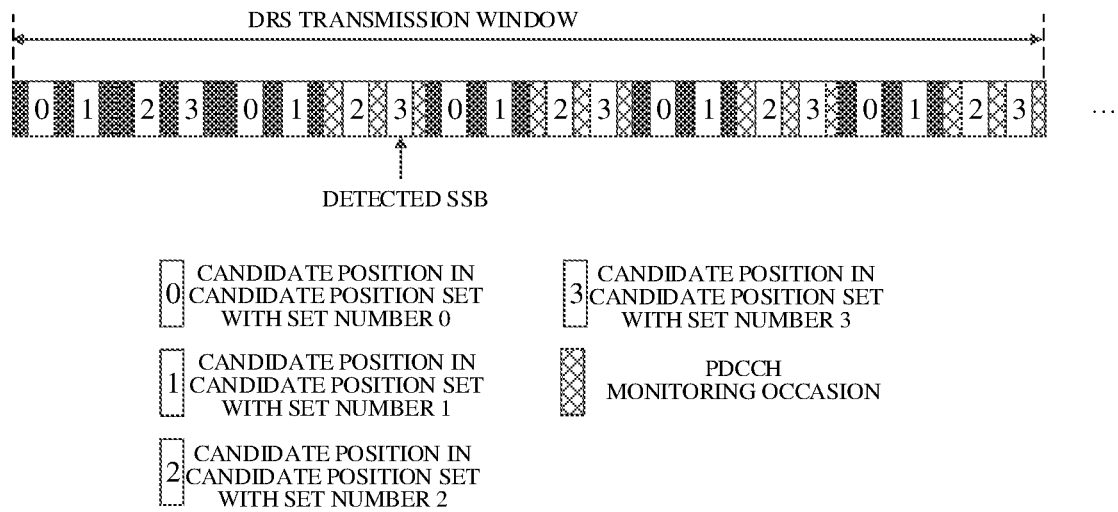

As illustrated in FIG. 12, as an example, after detecting an SSB at a candidate position in a candidate position set with set number 3, a terminal device may determine the following time slots as the Type0-PDCCH monitoring occasion: a time slot where the SSB is detected, and a time slot where candidate positions in the candidate position set with set number 3 are located, the time slot is subsequent to the time slot where the SSB is detected.

In some other implementations of the present disclosure, the Type0-PDCCH monitoring occasion may be determined according to a parameter indicated by a network.

For example, the Type0-PDCCH monitoring occasion may be determined according to parameters O and M mentioned above. For example, a time slot is determined as the first time slot of the Type0-PDCCH monitoring occasion according to the parameters O and M. Then, the following time slot is determined as the Type0-PDCCH monitoring occasion: the time slot is subsequent to the first time slot, and multiple SSB candidate positions in a QCL relationship are located in the time slot. For another example, a time slot is determined as the first time slot of the Type0-PDCCH monitoring occasion according to the parameters O and M. Then, the following time slot is determined as the Type0-PDCCH monitoring occasion: the time slot is subsequent to the first time slot and has a certain offset from the first time slot, and multiple SSB candidate positions in a QCL relationship are located in the time slot. The offset can be predefined, or be indicated by a network.

In other words, the second time slot may be a time slot determined based on indication information or a parameter configured by a network device. For example, the network device determines the indication information, and transmits the indication information to the terminal device. After receiving the indication information transmitted by the network device, the terminal device determines the second time slot according to the indication information.

As an example, the indication information is a COT indication information, and the COT indication information indicates a start time of COT.

In this case, the terminal device may determine a time slot where the start time is located or a time slot subsequent to the time slot where the start time is located as the second time slot.

In the DRS transmission window, the network device needs to perform LBT to obtain channel occupation for transmitting an SSB. In the DRS transmission window, if the Type0-PDCCH monitoring occasion is located in one or more of time slots where multiple candidate positions in a QCL relationship are located, the terminal device can determine the Type0-PDCCH monitoring occasion according to the COT indication information. For example, according to the start time of the COT indicated by the COT indication information, the terminal device may determine the following time slot as the Type0-PDCCH monitoring occasion: the time slot is subsequent to the start time, and the multiple candidate positions in a QCL relationship are located in the time slot.

Figure 13:
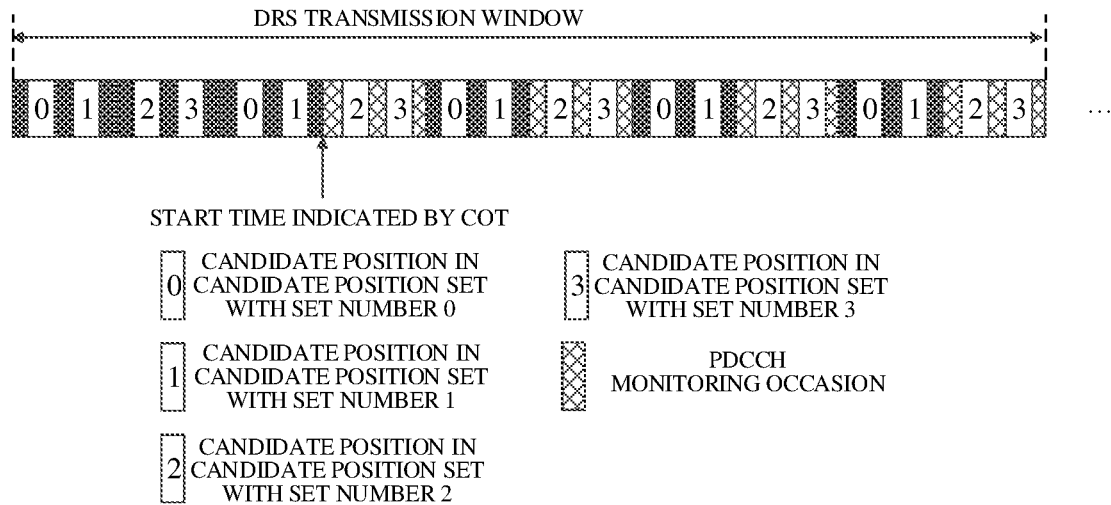

As illustrated in FIG. 13, as an example, after a terminal device in a connected state receives a COT, if a candidate position where a first SSB received by the terminal device is located belongs to a candidate position set with set number 3, the terminal device may determine the following time slot as the Type0-PDCCH monitoring occasion: the time slot is subsequent to the start time indicated by the COT indication information, and candidate positions in the candidate position set with set number 3 are located in the time slot.

In some implementations of the present disclosure, the PDCCH monitoring occasion includes multiple consecutive or non-consecutive time slots.

In some implementations of the present disclosure, the at least one candidate position is multiple candidate positions.

Some implementations of the present disclosure are described in detail above with reference to the accompanying drawings. However, the present disclosure is not limited to the specific details in implementations above. Within the scope of the technical concept of the present disclosure, various simple modifications can be made to the technical solutions of the present disclosure and are considered to be within the scope of the present disclosure.

For example, the various specific technical features described in specific implementations above can be combined in any suitable manner without contradiction. To avoid unnecessary repetition, various possible combinations are not further described herein.

For another example, various different implementations of the present disclosure can also be combined arbitrarily without violating the idea of the present disclosure, and such combination should also be regarded as the content disclosed in the present disclosure.

It should be understood that, in various method implementations of the present disclosure, the size of the sequence number of each process described above does not mean the order of execution. The execution order of each process should be determined by its function and internal logic, which shall not constitute any limitation on the implementation process of the implementations of the present disclosure.

A method for PDCCH detection according to implementations of the present disclosure is described in detail above from the perspective of a terminal device with reference to FIGS. 2 to 13. A method for PDCCH transmission according to implementations of the present disclosure will be described below from the perspective of a network device with reference to FIG. 2.

As illustrated in FIG. 2, the method 200 may further include following.

At S230, the network device determines at least one candidate position of a first SSB, where SSBs at the at least one candidate position are QCL.

At S240, the network device determines a PDCCH monitoring occasion corresponding to the at least one candidate position.

At S250, the network device transmits a PDCCH on the PDCCH monitoring occasion to the terminal device.

In some implementations of the present disclosure, the at least one candidate position corresponds to a same PDCCH monitoring occasion.

In some implementations of the present disclosure, the at least one candidate position belongs to a same candidate position set.

In this case, in S240, as an example, the network device may first determine a set number of the candidate position set that the at least one candidate position belongs to, and then determine the PDCCH monitoring occasion according to the set number.

For example, the network device may determine the set number according to the following formula:

$$j = SSB_{-i} \bmod Q,$$

where j represents the set number, i represents a position index of a candidate position among the at least one candidate position, Q represents a parameter for determining a QCL relationship of the first SSB, and mod represents a modulo operator.

For another example, the network device may determine the set number according to the following formula:

$$j = DMRS_{-i} \bmod Q,$$

where j represents the set number, $DMRS_{-i}$ represents a DMRS sequence index in an SSB at a candidate position among the at least one candidate position, Q represents a parameter for determining a QCL relationship of the first SSB, and mod represents a modulo operator.

In some implementations of the present disclosure, the network device may determine the PDCCH monitoring occasion according to the set number as follows. The network device may first determine a first time slot according to the set number, then determine a first radio frame according to the set number, and finally determine the first time slot in the first radio frame and/or one or more time slots subsequent to the first time slot as the PDCCH monitoring occasion.

For example, the network device may determine the first time slot according to the following formula:

$$n_0 = (O \cdot 2^\mu + \lfloor j \cdot M \rfloor) \bmod N_{slot}^{frame,\mu},$$

where $n_0$ represents a number of the first time slot, $N_{slot}^{frame,\mu}$ represents the quantity of time slots in a radio frame, M and O are parameters in system information, a value of $\mu$ is determined according to a subcarrier spacing of the PDCCH, j represents the set number, mod represents a modulo operator, and $\lfloor \ \rfloor$ represents a floor operator.

For example, an even numbered radio frame is determined as the first radio frame when $\lfloor (O \cdot 2^\mu + \lfloor j \cdot M \rfloor) / N_{slot}^{frame,\mu} \rfloor \bmod 2 = 0$.

For another example, an odd numbered radio frame is determined as the first radio frame when $\lfloor (O \cdot 2^\mu + \lfloor j \cdot M \rfloor) / N_{slot}^{frame,\mu} \rfloor \bmod 2 = 1$.

$n_0$ represents a number of the first time slot, $N_{slot}^{frame,\mu}$ represents the quantity of time slots in a radio frame, M and O are parameters in system information, a value of $\mu$ is determined according to a subcarrier spacing of the PDCCH, j represents the set number, mod represents a modulo operator, and $\lfloor \ \rfloor$ represents a floor operator.

In some other implementations of the present disclosure, the terminal device may directly determine at least one time slot among time slots where the at least one candidate position is located as the PDCCH monitoring occasion.

For example, the network device may first determine a second time slot among the time slots where the at least one candidate position is located, and then determine the second time slot and/or one or more time slots subsequent to the second time slot among the time slots where the at least one candidate position is located as the PDCCH monitoring occasion.

In some implementations of the present disclosure, the second time slot is the last time slot or the first time slot among the time slots where the at least one candidate position is located.

In some other implementations of the present disclosure, the second time slot may be a time slot determined by the network device.

For example, the network device may first determine indication information for determining the second time slot.

In this case, the network device may determine the second time slot according to the indication information.

Further, the network device may also transmit the indication information to the terminal device, so that the terminal device can also determine the second time slot according to the indication information.

As an example, the indication information may be COT indication information, and the COT indication information indicates a start time of COT.

In this case, the network device may determine a time slot where the start time is located or a time slot subsequent to the time slot where the start time is located as the second time slot.

In some implementations of the present disclosure, the PDCCH monitoring occasion includes multiple consecutive or non-consecutive time slots.

In some implementations of the present disclosure, the at least one candidate position is multiple candidate positions.

It should be understood that, specific implementation manners of operations at S230 and S240 on the network device side in the method 200 may refer to corresponding descriptions for S210 and S220 on the terminal device side, respectively, which will not be repeated herein for the sake of simplicity.

Method implementations of the present disclosure are described in detail above with reference to FIGS. 1 to 13. Device implementations of the present disclosure will be described in detail below with reference to FIGS. 14 to 17.

Figure 14:
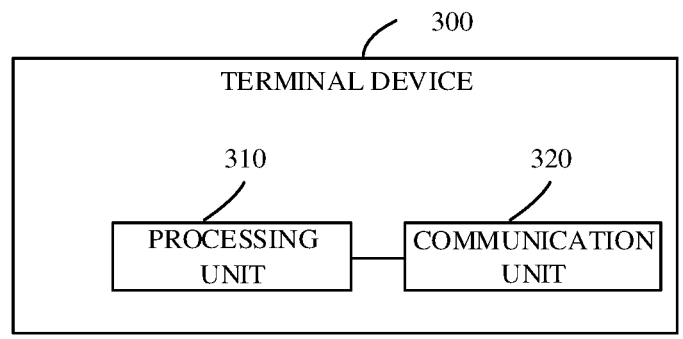
FIG. 14 is a schematic block diagram of a terminal device according to implementations of the present disclosure.

FIG. 14 is a schematic block diagram of a terminal device 300 according to implementations of the present disclosure.

Referring to FIG. 14, the terminal device 300 may include a processing unit 310 and a communication unit 320.

The processing unit 310 is configured to determine at least one candidate position of a first SSB, where SSBs at the at least one candidate position are QCL, and determine a PDCCH monitoring occasion corresponding to the at least one candidate position.

The communication unit 320 is configured to detect a PDCCH at the PDCCH monitoring occasion.

In some implementations of the present disclosure, the at least one candidate position corresponds to a same PDCCH monitoring occasion.

In some implementations of the present disclosure, the at least one candidate position belongs to a same candidate position set. The processing unit 310 is configured to determine a set number of the candidate position set that the at least one candidate position belongs to, and determine the PDCCH monitoring occasion according to the set number.

In some implementations of the present disclosure, the processing unit 310 is configured to determine the set number according to the following formula:

$$j = i \bmod Q,$$

where j represents the set number, i represents a position index of a candidate position among the at least one candidate position, Q represents a parameter for determining a QCL relationship of the first SSB, and mod represents a modulo operator.

In some implementations of the present disclosure, the processing unit 310 is configured to determine the set number according to the following formula:

$$j = DMRS_{\_i} \bmod Q,$$

where j represents the set number, $DMRS_{\_i}$ represents a DMRS sequence index in an SSB at a candidate position among the at least one candidate position, Q represents a parameter for determining a QCL relationship of the first SSB, and mod represents a modulo operator.

In some implementations of the present disclosure, the processing unit 310 is configured to determine a first time slot according to the set number, determine a first radio frame according to the set number, and determine the first time slot in the first radio frame and/or one or more time slots subsequent to the first time slot as the PDCCH monitoring occasion.

In some implementations of the present disclosure, the processing unit 310 is configured to determine the first time slot according to the following formula:

$$n_0 = (O \cdot 2^\mu + \lfloor j \cdot M \rfloor) \bmod N_{slot}^{frame,\mu},$$

where $n_0$ represents a number of the first time slot, $N_{slot}^{frame,\mu}$ represents the quantity of time slots in a radio frame, M and O are parameters in system information, a value of $\mu$ is determined according to a subcarrier spacing of the PDCCH, j represents the set number, mod represents a modulo operator, and $\lfloor \ \rfloor$ represents a floor operator.

In some implementations of the present disclosure, the processing unit 310 is configured to: determine an even numbered radio frame as the first radio frame when $\lfloor (O \cdot 2^\mu + \lfloor j \cdot M \rfloor)/N_{slot}^{frame,\mu} \rfloor \bmod 2 = 0$, and/or determine an odd numbered radio frame as the first radio frame when $\lfloor (O \cdot 2^\mu + \lfloor j \cdot M \rfloor)/N_{slot}^{frame,\mu} \rfloor \bmod 2 = 1$, where $n_0$ represents a number of the first time slot, $N_{slot}^{frame,\mu}$ represents the quantity of time slots in a radio frame, M and O are parameters in system information, a value of $\mu$ is determined according to a subcarrier spacing of the PDCCH, J represents the set number, mod represents a modulo operator, and L represents a floor operator.

In some implementations of the present disclosure, the processing unit 310 is configured to determine at least one time slot among time slots where the at least one candidate position is located as the PDCCH monitoring occasion.

In some implementations of the present disclosure, the processing unit 310 is configured to determine a second time slot among the time slots where the at least one candidate position is located, and determine the second time slot and/or one or more time slots subsequent to the second time slot among the time slots where the at least one candidate position is located as the PDCCH monitoring occasion.

In some implementations of the present disclosure, the second time slot is the last time slot or the first time slot among the time slots where the at least one candidate position is located.

In some implementations of the present disclosure, the communication unit 320 is further configured to receive indication information transmitted by a network device.

The processing unit 310 is configured to determine the second time slot according to the indication information.

In some implementations of the present disclosure, the indication information is COT indication information, and the COT indication information indicates a start time of COT.

The processing unit 310 is configured to determine a time slot where the start time is located or a time slot subsequent to the time slot where the start time is located as the second time slot.

In some implementations of the present disclosure, the PDCCH monitoring occasion includes multiple consecutive or non-consecutive time slots.

In some implementations of the present disclosure, the at least one candidate position is multiple candidate positions.

It should be understood that, device implementations and method implementations may correspond to each other, and similar descriptions may refer to the method implementations. The terminal device 300 illustrated in FIG. 14 may correspond to a corresponding subject that performs the method 200 in the implementations of the present disclosure. The foregoing and other operations and/or functions of each unit in the terminal device 300 are to implement corresponding operations in each method illustrated in FIG. 2 respectively, which will not be repeated herein for the sake of simplicity.

Figure 15:
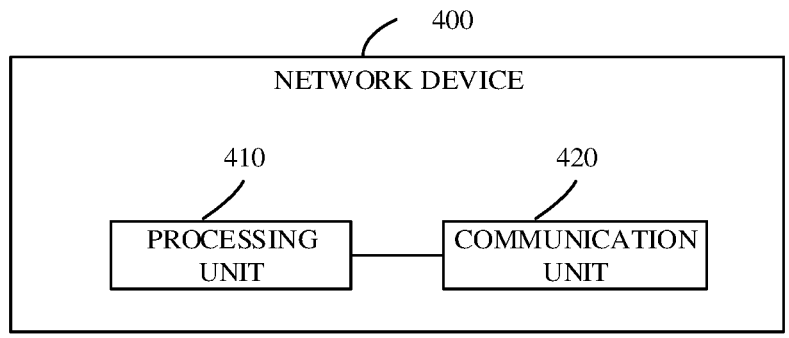
FIG. 15 is a schematic block diagram of a network device according to implementations of the present disclosure.

FIG. 15 is a schematic block diagram of a network device according to implementations of the present disclosure.

As illustrated in FIG. 15, the network device 400 may include a processing unit 410 and a communication unit 420.

The processing unit 410 is configured to determine at least one candidate position of a first SSB, where SSBs at the at least one candidate position are QCL, and determine a PDCCH monitoring occasion corresponding to the at least one candidate position.

The communication unit 420 is configured to transmit a PDCCH at the PDCCH monitoring occasion.

In some implementations of the present disclosure, the at least one candidate position corresponds to a same PDCCH monitoring occasion.

In some implementations of the present disclosure, the at least one candidate position belongs to a same candidate position set.

The processing unit 410 is configured to determine a set number of the candidate position set that the at least one candidate position belongs to, and determine the PDCCH monitoring occasion according to the set number.

In some implementations of the present disclosure, the processing unit 410 is configured to determine the set number according to the following formula:

$$j = \text{SSB}_{-i} \bmod Q,$$

where j represents the set number, i represents a position index of a candidate position among the at least one candidate position, Q represents a parameter for determining a QCL relationship of the first SSB, and mod represents a modulo operator.

In some implementations of the present disclosure, the processing unit 410 is configured to determine the set number according to the following formula:

$$j = \text{DMRS}_{-i} \bmod Q,$$

where j represents the set number, $\text{DMRS}_{-i}$ represents a DMRS sequence index in an SSB at a candidate position among the at least one candidate position, Q represents a parameter for determining a QCL relationship of the first SSB, and mod represents a modulo operator.

In some implementations of the present disclosure, the processing unit 410 is configured to determine a first time slot according to the set number, determine a first radio frame according to the set number, and determine the first time slot in the first radio frame and/or one or more time slots subsequent to the first time slot as the PDCCH monitoring occasion.

In some implementations of the present disclosure, the processing unit 410 is configured to determine the first time slot according to the following formula:

$$n_0 = (O \cdot 2^\mu + \lfloor j \cdot M \rfloor) \bmod N_{slot}^{frame,\mu},$$

where $n_0$ represents a number of the first time slot, $N_{slot}^{frame,\mu}$ represents the quantity of time slots in a radio frame, M and O are parameters in system information, a value of μ is determined according to a subcarrier spacing of the PDCCH, j represents the set number, mod represents a modulo operator, and $\lfloor \ \rfloor$ represents a floor operator.

In some implementations of the present disclosure, the processing unit 410 is configured to: determine an even numbered radio frame as the first radio frame when $\lfloor (O \cdot 2^\mu + \lfloor j \cdot M \rfloor)/N_{slot}^{frame,\mu} \rfloor \bmod 2 = 0$, and/or determine an odd numbered radio frame as the first radio frame when $\lfloor (O \cdot 2^\mu + \lfloor j \cdot M \rfloor)/N_{slot}^{frame,\mu} \rfloor \bmod 2 = 1$, where $n_0$ represents a number of the first time slot, $N_{slot}^{frame,\mu}$ represents the quantity of time slots in a radio frame, M and O are parameters in system information, a value of μ is determined according to a subcarrier spacing of the PDCCH, j represents the set number, mod represents a modulo operator, and L represents a floor operator.

In some implementations of the present disclosure, the processing unit 410 is configured to determine at least one time slot among time slots where the at least one candidate position is located as the PDCCH monitoring occasion.

In some implementations of the present disclosure, the processing unit 410 is configured to determine a second time slot among the time slots where the at least one candidate position is located, and determine the second time slot and/or one or more time slots subsequent to the second time slot among the time slots where the at least one candidate position is located as the PDCCH monitoring occasion.

In some implementations of the present disclosure, the second time slot is the last time slot or the first time slot among the time slots where the at least one candidate position is located.

In some implementations of the present disclosure, the processing unit 410 is configured to determine indication information, and determine the second time slot according to the indication information.

The communication unit 420 is further configured to transmit the indication information to a terminal device.

In some implementations of the present disclosure, the indication information is COT indication information, and the COT indication information indicates a start time of COT.

The processing unit 410 is configured to determine a time slot where the start time is located or a time slot subsequent to the time slot where the start time is located as the second time slot.

In some implementations of the present disclosure, the PDCCH monitoring occasion includes multiple consecutive or non-consecutive time slots.

In some implementations of the present disclosure, the at least one candidate position is multiple candidate positions.

It should be understood that, device implementations and method implementations may correspond to each other, and similar descriptions may refer to the method implementations. The network device 400 illustrated in FIG. 15 may correspond to a corresponding subject that performs the method 200 in the implementation of the present disclosure. The foregoing and other operations and/or functions of each unit in the network device 400 are to implement corresponding operations in each method illustrated in FIG. 2 respectively, which will not be repeated herein for the sake of simplicity.

A communication device according to implementations of the present disclosure is described above from the perspective of functional modules with reference to FIGS. 14 and 15. It should be understood that, the functional modules can be implemented in the form of hardware, software instructions, or a combination of hardware and software modules.

Specifically, operations in the method implementations of the present disclosure can be completed by an integrated logic circuit of hardware in the processor and/or an instruction in the form of software. The steps of the method disclosed in implementations of the present disclosure may be directly implemented as a hardware decoding processor, or may be performed by hardware and software modules in the decoding processor.

Optionally, the software module can be located in a storage medium such as a random-access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

For example, the processing unit and the communication unit mentioned above may be implemented by a processor and a transceiver, respectively.

Figure 16:
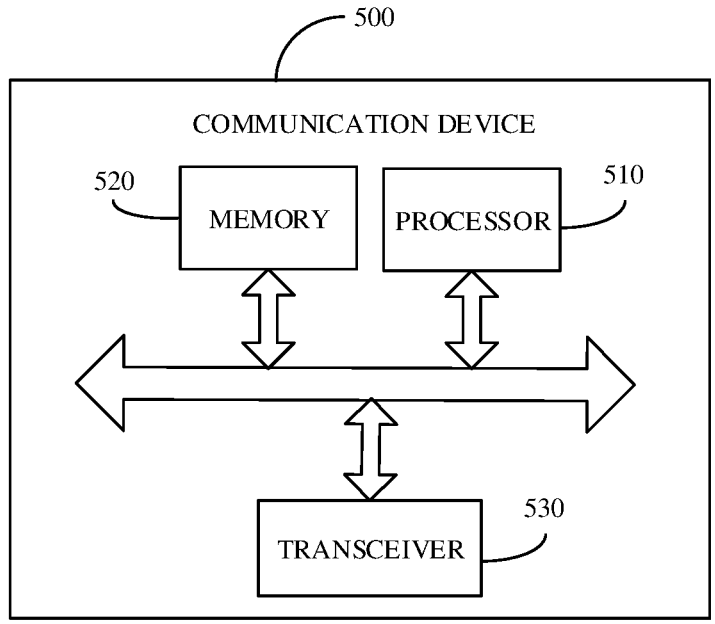
FIG. 16 is a schematic block diagram of a communication device according to implementations of the present disclosure.

FIG. 16 is a schematic structural diagram of a communication device 500 according to implementations of the present disclosure.

Referring to FIG. 16, the communication device 500 may include a processor 510.

The processor 510 may invoke and execute computer programs stored in a memory to perform the method in the implementations of the present disclosure.

Referring to FIG. 16, the communication device 500 may further include a memory 520.

The memory 520 may be configured to store indication information and codes and instructions executed by the processor 510. The processor 510 may invoke and execute the computer programs stored in the memory 520 to perform the method in the implementations of the present disclosure. The memory 520 may be a separate device independent of the processor 510, or may be integrated into the processor 510.

Referring to FIG. 16, the communication device 500 may further include a transceiver 530.

The processor 510 may control the transceiver 530 to communicate with other devices, for example, to send information or data to other devices, or to receive information or data from other devices. The transceiver 530 may include a transmitter and a receiver. The transceiver 530 may further include an antenna, where one or more antenna may be provided.

It should be understood that, various components in the communication device 500 are connected via a bus system, where in addition to a data bus, the bus system may also include a power bus, a control bus, and a status signal bus.

It should also be understood that, the communication device 500 may be the terminal device in the implementations of the present disclosure, and the communication device 500 may implement corresponding operations implemented by the terminal device in each method in the implementations of the present disclosure. That is, the communication device 500 in the implementations of the present disclosure may correspond to the terminal device 300 in the implementations of the present disclosure, and may correspond to a corresponding subject that performs the method 200 in the implementations of the present disclosure, which will not be repeated herein for the sake of simplicity. Similarly, the communication device 500 may be the network device in the implementations of the present disclosure, and the communication device 500 may implement corresponding operations implemented by the network device in each method in the implementations of the present disclosure. That is, the communication device 500 in the implementations of the present disclosure may correspond to the network device 400 in the implementations of the present disclosure, and may correspond to a corresponding subject that performs the method 200 in the implementations of the present disclosure, which will not be repeated herein for the sake of simplicity.

In addition, a chip is also provided in implementations of the present disclosure.

For example, the chip may be an integrated circuit chip with a signal processing capability, and may implement or perform the methods, steps, and logic blocks disclosed in implementations of the present disclosure. The chip may also be referred to as a system-level chip, a system chip, a chip system, or a system-on-chip (SOC) chip, etc. Optionally, the chip can be applied to various communication devices to enable the communication device installed with the chip to perform the methods, steps, and logic blocks disclosed in implementations of the present disclosure.

Figure 17:
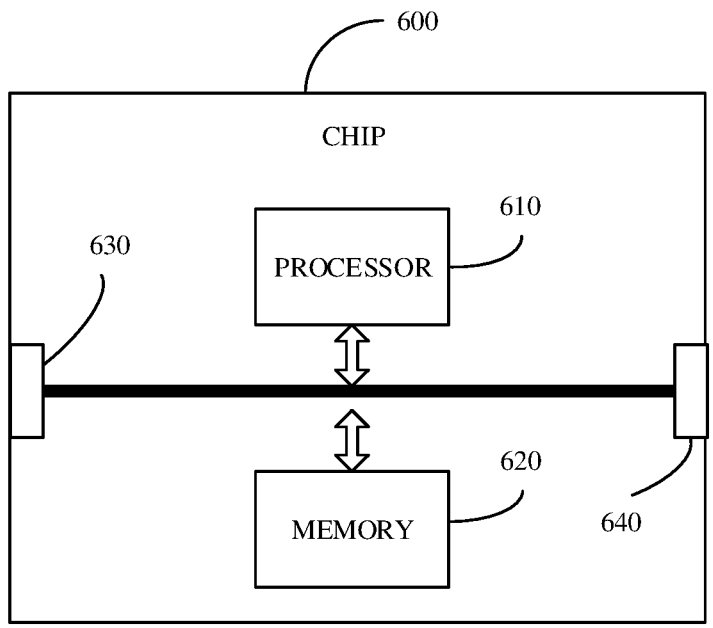
FIG. 17 is a schematic block diagram of a chip according to implementations of the present disclosure.

FIG. 17 is a schematic structural diagram of a chip 600 according to implementations of the present disclosure.

Referring to FIG. 17, the chip 600 includes a processor 610.

The processor 610 is configured to invoke and execute computer programs stored in a memory to perform the method in the implementations of the present disclosure.

Referring to FIG. 17, the chip 600 may further include a memory 620.

The processor 610 may invoke and execute the computer programs stored in the memory 620 to perform the method in the implementations of the present disclosure. The memory 620 may be configured to store indication information and codes and instructions executed by the processor 610. The memory 620 may be a separate device independent of the processor 610, or may be integrated into the processor 610.

Referring to FIG. 17, the chip 600 may further include an input interface 630.

The processor 610 can control the input interface 630 to communicate with other devices or chips, for example, to acquire information or data sent by other devices or chips.

Referring to FIG. 17, the chip 600 may further include an output interface 640.

The processor 610 can control the output interface 640 to communicate with other devices or chips, for example, to output information or data to other devices or chips.

It should be understood that, the chip 600 is applicable to the network device in the implementations of the present disclosure. The chip can implement corresponding operations implemented by the network device in each method in the implementations of the present disclosure, and can also implement corresponding operations implemented by the terminal device in each method in the implementations of the present disclosure, which will not be repeated herein for the sake of simplicity. It should also be understood that, various components in the chip 600 are connected via a bus system, where in addition to a data bus, the bus system may also include a power bus, a control bus, and a status signal bus.

The processor includes but is not limited to a general-purpose processor, a digital signal processor (DSP), an application specific integrated circuit (ASIC), a field programmable gate array (FPGA), or other programmable logic devices, discrete gates or transistor logic devices, discrete hardware components, etc.

The processor may be configured to implement or execute the methods, steps, and logic blocks disclosed in implementations of the present disclosure. The steps of the method disclosed in implementations of the present disclosure may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

The storage includes but is not limited to a volatile memory and/or a non-volatile memory. The non-volatile memory may be a ROM, a PROM, an erasable PROM (EPROM), an electrically EPROM (EEPROM), or flash memory. The volatile memory can be a RAM that acts as an external cache. By way of example rather than limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SL-DRAM), and a direct rambus RAM (DR RAM).

It should be noted that, the memory described herein is intended to include these and any other suitable types of memory. A computer-readable storage medium is further provided in implementations of the present disclosure. The computer-readable storage medium is configured to store computer programs. The computer-readable storage medium stores one or more programs. The one or more programs include instructions that, when executed, are operable with a portable electronic device that includes multiple application programs to perform operations in the method 200 in the implementations of the present disclosure. Optionally, the computer readable storage medium is applicable to the network device in implementations of the present disclosure. The computer programs, when executed, are operable with a computer to implement the operations performed by the network device described in the foregoing method implementations, which will not be repeated herein for the sake of simplicity. Optionally, the computer readable storage medium is applicable to the mobile terminal/the terminal device of implementations of the present disclosure. The computer programs, when executed, are operable with a computer to implement corresponding operations performed by the mobile terminal/the terminal device described in the foregoing method implementations, which will not be repeated herein for the sake of simplicity.

A computer program product is also provided in implementations of the present disclosure. The computer program product includes computer programs.

Optionally, the computer program product is applicable to the network device of implementations. The computer programs, when executed, are operable with a computer to implement the operations performed by the network device described in the foregoing method implementations, which will not be repeated herein for the sake of simplicity.

Optionally, the computer program product is applicable to the mobile terminal/the terminal device. The computer program instructions, when executed, are operable with a computer to implement the operations performed by the mobile terminal/the terminal device described in the foregoing method implementations, which will not be repeated herein for the sake of simplicity.

A computer program is also provided in implementations of the present disclosure. The computer program, when executed, is operable with a computer to perform operations in the method 200 in the implementations of the present disclosure.

Optionally, the computer program is applicable to the network device of implementations. The computer program, when executed by a computer, is operable with the computer to implement the operations performed by the network device described in the foregoing method implementations, which will not be repeated herein for the sake of simplicity.

In addition, a communication system is also provided in implementations of the present disclosure. The communication system may include terminal device and the network device mentioned above to form the communication system 100 as illustrated in FIG. 1, which will not be repeated herein for the sake of simplicity. It should be noted that, the terms "system" and the like in the present disclosure can also be referred to as "network management architecture" or "network system".

It should also be understood that, the terms used in the implementations of the present disclosure and the appended claims are only for the purpose of describing specific implementations, and are not intended to limit the implementations of the present disclosure.

For example, the singular forms of "a", "the", and "said" used in the implementations of the present disclosure and the appended claims are also intended to include plural forms, unless the context clearly indicates otherwise.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functions, but such methods should not be regarded as lying beyond the scope of the disclosure.

If the functions are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations provided herein may also be implemented in various other manners. For example, the division of units, modules, or assemblies in device implementations described above is only a division of logical functions, and there may exist other manners of division in practice. For example, multiple units, modules, or assemblies may be combined or may be integrated into another system, or some units, modules, or assemblies may be ignored or skipped.

For another example, the units/modules/assemblies described as separate/displayed parts may or may not be physically separated, that is, may be located in one place, or may be distributed on multiple network units. Some or all of the units/modules/assemblies may be selected according to actual needs to achieve the objectives of the implementations of the present disclosure.

Finally, it should be noted that, the coupling, direct coupling, or communication connection illustrated or discussed above may be an indirect coupling or communication connection via some interface, device or unit, and may be electrical, mechanical, or otherwise.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for physical downlink control channel (PDCCH) detection, performed by a terminal device and comprising:
   determining at least one candidate position of a first synchronization signal block (SSB), wherein SSBs at the at least one candidate position are quasi co-located (QCL), and the at least one candidate position belongs to a same candidate position set;
   determining a set number of the candidate position set that the at least one candidate position belongs to;
   determining a PDCCH monitoring occasion corresponding to the at least one candidate position according to the set number; and
   detecting a PDCCH on the PDCCH monitoring occasion, wherein
   determining the set number of the candidate position set that the at least one candidate position belongs to comprises:
   determining the set number according to the following formula:

$j = i \bmod Q;$ where j represents the set number, i represents a position index of a candidate position among the at least one candidate position, Q represents a parameter for determining a QCL relationship of the first SSB, and mod represents a modulo operator; or
   determining the set number according to the following formula:

$j = DMRS_{-i} \bmod Q;$ where j represents the set number, $DMRS_{-i}$ represents a demodulation reference signal (DMRS) sequence index in an SSB at a candidate position among the at least one candidate position, Q represents a parameter for determining a QCL relationship of the first SSB, and mod represents a modulo operator,
   wherein determining the PDCCH monitoring occasion according to the set number comprises:
   determining a first time slot according to the set number;
   determining a first radio frame according to the set number; and
   determining at least one of the first time slot in the first radio frame or one or more time slots subsequent to the first time slot as the PDCCH monitoring occasion.

2. The method of claim 1, wherein the at least one candidate position corresponds to a same PDCCH monitoring occasion.

3. A method for physical downlink control channel (PDCCH) transmission, performed by a network device and comprising:
   determining at least one candidate position of a first synchronization signal block (SSB), wherein SSBs at the at least one candidate position are quasi co-located (QCL), and the at least one candidate position belongs to a same candidate position set;
   determining a set number of the candidate position set that the at least one candidate position belongs to;
   determining a PDCCH monitoring occasion corresponding to the at least one candidate position according to the set number; and
   transmitting a PDCCH on the PDCCH monitoring occasion, wherein
   determining the set number of the candidate position set that the at least one candidate position belongs to comprises:
   determining the set number according to the following formula:

$j = SSB_{-i} \bmod Q;$ where j represents the set number, i represents a position index of a candidate position among the at least one candidate position, Q represents a parameter for determining a QCL relationship of the first SSB, and mod represents a modulo operator; or
   determining the set number according to the following formula:

$j = DMRS_{-i} \bmod Q;$ where j represents the set number, $DMRS_{-i}$ represents a demodulation reference signal (DMRS) sequence index in an SSB at a candidate position among the at least one candidate position, Q represents a parameter for determining a QCL relationship of the first SSB, and mod represents a modulo operator,
   wherein determining the PDCCH monitoring occasion according to the set number comprises:
   determining a first time slot according to the set number;
   determining a first radio frame according to the set number; and
   determining at least one of the first time slot in the first radio frame or one or more time slots subsequent to the first time slot as the PDCCH monitoring occasion.

4. The method of claim 3, wherein the at least one candidate position corresponds to a same PDCCH monitoring occasion.

5. The method of claim 3, wherein the PDCCH monitoring occasion comprises a plurality of consecutive or non-consecutive time slots, and the at least one candidate position is a plurality of candidate positions.

6. A terminal device, comprising:
   a memory configured to store computer programs; and
   a processor configured to invoke and execute the computer programs stored in the memory to:

determine at least one candidate position of a first synchronization signal block (SSB), wherein SSBs at the at least one candidate position are quasi co-located (QCL), and the at least one candidate position belongs to a same candidate position set;

determine a set number of the candidate position set that the at least one candidate position belongs to;

determine a PDCCH monitoring occasion corresponding to the at least one candidate position according to the set number; and detect a PDCCH at the PDCCH monitoring occasion, wherein the processor configured to determine the set number of the candidate position set that the at least one candidate position belongs to is configured to:

determine the set number according to the following formula:

$j = i \bmod Q;$ where j represents the set number, i represents a position index of a candidate position among the at least one candidate position, Q represents a parameter for determining a QCL relationship of the first SSB, and mod represents a modulo operator; or determine the set number according to the following formula:

$j = \text{DMRS-}i \bmod Q;$ where j represents the set number, DMRS-i represents a demodulation reference signal (DMRS) sequence index in an SSB at a candidate position among the at least one candidate position, Q represents a parameter for determining a QCL relationship of the first SSB, and mod represents a modulo operator, wherein the processor configured to determine the PDCCH monitoring occasion according to the set number is configured to:

determine a first time slot according to the set number;

determine a first radio frame according to the set number; and determine at least one of the first time slot in the first radio frame or one or more time slots subsequent to the first time slot as the PDCCH monitoring occasion.

7. A network device, comprising:
a memory configured to store computer programs; and
a processor configured to invoke and execute the computer programs stored in the memory to:

determine at least one candidate position of a first synchronization signal block (SSB), wherein SSBs at the at least one candidate position are quasi co-located (QCL), and the at least one candidate position belongs to a same candidate position set;

determine a set number of the candidate position set that the at least one candidate position belongs to;

determine a PDCCH monitoring occasion corresponding to the at least one candidate position according to the set number; and transmit a PDCCH at the PDCCH monitoring occasion, wherein the processor configured to determine the set number of the candidate position set that the at least one candidate position belongs to is configured to:

determine the set number according to the following formula:

$j = i \bmod Q;$ where j represents the set number, i represents a position index of a candidate position among the at least one candidate position, Q represents a parameter for determining a QCL relationship of the first SSB, and mod represents a modulo operator; or determine the set number according to the following formula:

$j = \text{DMRS-}i \bmod Q;$ where j represents the set number, DMRS-i represents a demodulation reference signal (DMRS) sequence index in an SSB at a candidate position among the at least one candidate position, Q represents a parameter for determining a QCL relationship of the first SSB, and mod represents a modulo operator, wherein the processor configured to determine the PDCCH monitoring occasion according to the set number is configured to:

determine a first time slot according to the set number;

determine a first radio frame according to the set number; and determine at least one of the first time slot in the first radio frame or one or more time slots subsequent to the first time slot as the PDCCH monitoring occasion.

* * * * *